W. G. MILLER.
AMUSEMENT DEVICE.
APPLICATION FILED MAR. 4, 1922.

1,430,396.

Patented Sept. 26, 1922.
5 SHEETS—SHEET 1.

W. G. Miller INVENTOR
BY Victor J. Evans
ATTORNEY

WITNESS:

W. G. MILLER.
AMUSEMENT DEVICE.
APPLICATION FILED MAR. 4, 1922.
1,430,396.
Patented Sept. 26, 1922.
5 SHEETS—SHEET 2.
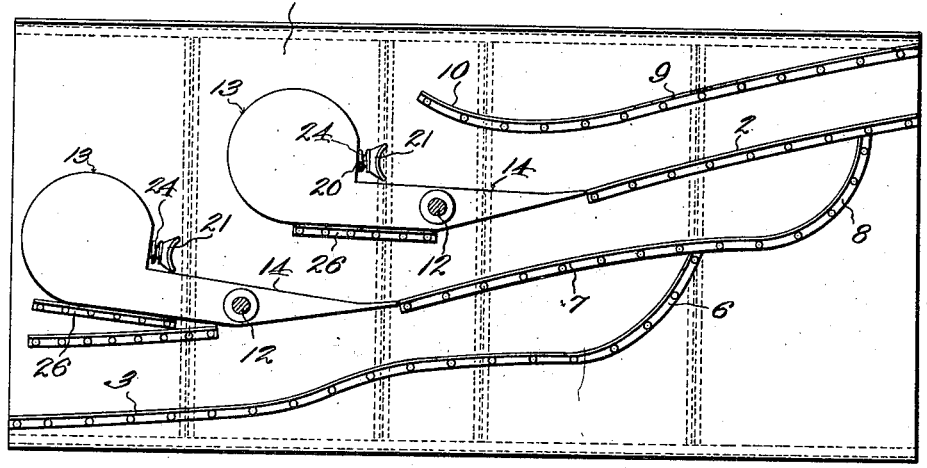
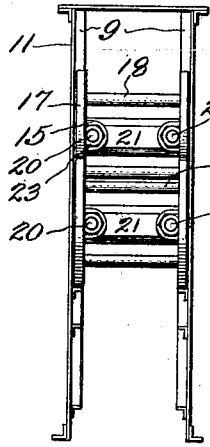
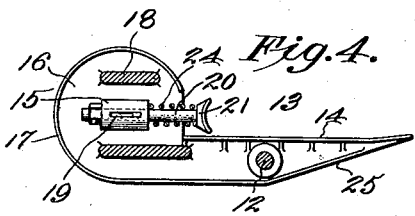
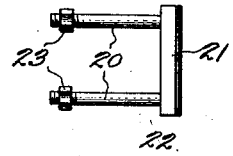
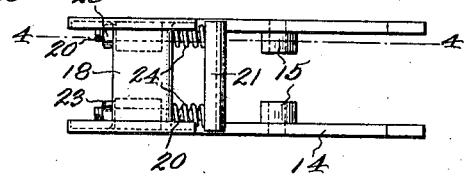
W. G. Miller,
INVENTOR
BY Victor J. Evans
ATTORNEY
WITNESS:

W. G. MILLER.
AMUSEMENT DEVICE.
APPLICATION FILED MAR. 4, 1922.
1,430,396.
Patented Sept. 26, 1922.
5 SHEETS—SHEET 3.
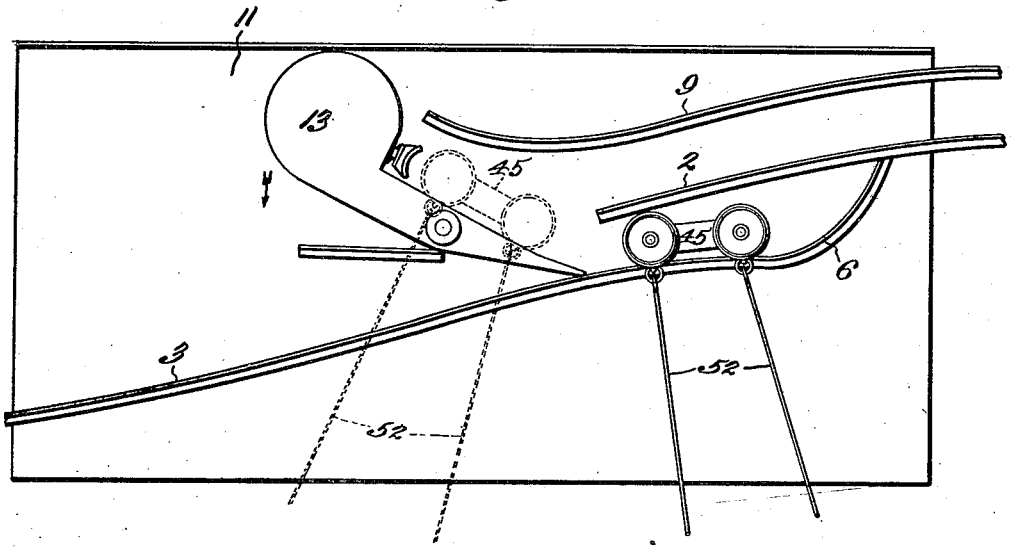
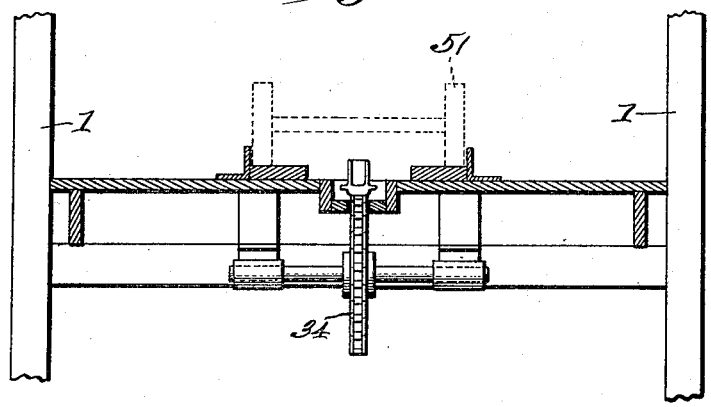

W. G. MILLER.
AMUSEMENT DEVICE.
APPLICATION FILED MAR. 4, 1922.
1,430,396.
Patented Sept. 26, 1922.
5 SHEETS—SHEET 4.
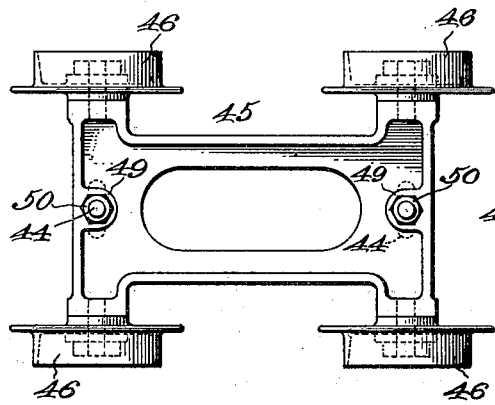
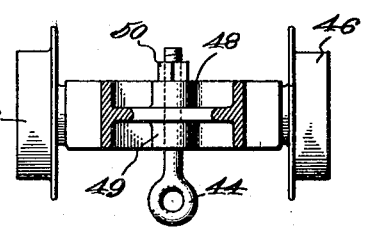
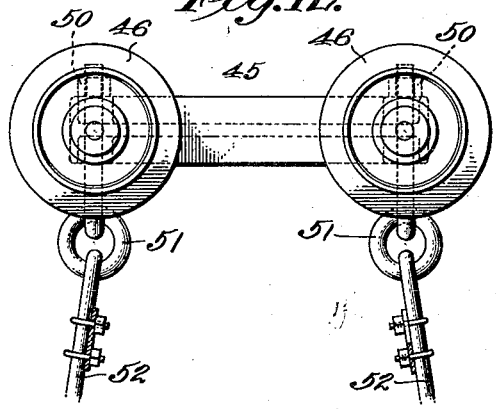
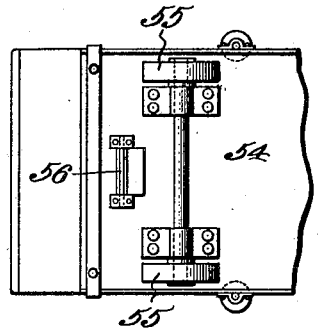
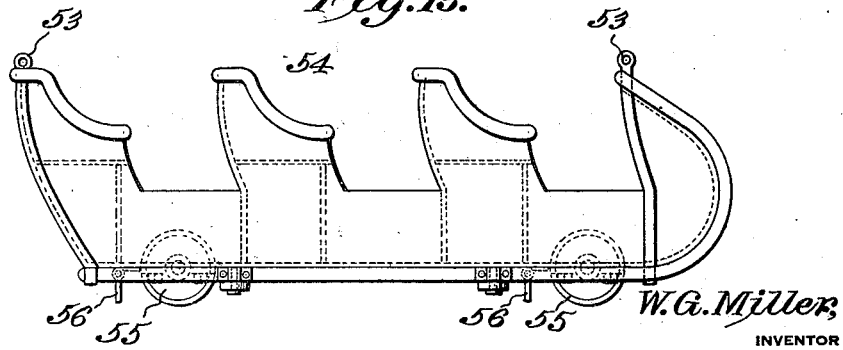
W. G. Miller,
INVENTOR
BY Victor J. Evans
ATTORNEY
WITNESS:

W. G. MILLER.
AMUSEMENT DEVICE.
APPLICATION FILED MAR. 4, 1922.

1,430,396.
Patented Sept. 26, 1922.
5 SHEETS—SHEET 5.

WITNESSES

W. G. Miller
INVENTOR
BY Victor J. Evans
ATTORNEY

Patented Sept. 26, 1922.

1,430,396

UNITED STATES PATENT OFFICE.

WILLIAM G. MILLER, OF BOSTON, PENNSYLVANIA.

AMUSEMENT DEVICE.

Application filed March 4, 1922. Serial No. 541,139.

*To all whom it may concern:*

Be it known that I, WILLIAM G. MILLER, a citizen of the United States, residing at Boston, in the county of Allegheny and State of Pennsylvania, have invented new and useful Improvements in Amusement Devices, of which the following is a specification.

My present invention has reference to an amusement device for use in parks, carnivals, etc.

My object is to produce an amusement device in which passengers seated in a car or cars to be moved in a circuitous path, and in the course of travel the car is caused to move in a reverse direction for a determined interval and is given a swinging movement at such intervals to impart an added sensation to the occupants thereof.

A further object is to produce an amusement device that includes a structure on which is mounted a track which is substantially elliptical in plan and which has its ends elevated and its side rails split or divided at the center thereof and disposed one above the other in spaced lapping relation, one or more switch rails being arranged between the main rails, while in a line with the uppermost main rails and in a line with the switch rails there are switches of a novel and peculiar construction, while designed for travel on the track there is a wheeled body or truck that has suspended therefrom the car in which the passengers are seated, power driven means being provided to engage with the car to move the truck to the elevated ends of the track, the truck thereafter gravitating along the inclined sides of the track and are brought into contact with buffer means on the switches, causing the said switches automatically to tilt to deliver the truck on to the switch rails, thus causing a reverse movement of the truck for the length of its travel on the switch rail, the switch rails being inclined again delivers the car on to the lower main rail, the truck gravitating therealong until the car is again engaged by the mechanical means which elevates the same with the truck at the opposite end of the track, permitting the said car to again gravitate on the opposite side of the track, to be delivered by the switch from the upper to the lower rail and gravitate upon said lower rail until the same is returned to the starting point.

A further object is to produce an amusement device wherein the passengers in addition to riding in a car over a track are subjected to movements in both an upward and outward direction as well as a reverse direction and also, at determined intervals have imparted thereto a swinging motion.

The drawings, which accompany and which form part of this specification, illustrate a satisfactory embodiment of the improvement as it now appears to me, and wherein:—

Figure 3 is a fragmentary side elevation at the portion of the device provided with the switch rail and switches.

Figure 4 is a sectional view through one of the tiltable platforms that provides a switch and taken on the line 4—4 of Figure 5.

Figure 5 is a plan view of the switch.

Figure 6 is a view looking toward the left hand end of the construction disclosed in Figure 3.

Figure 7 is a plan view of one of the bumpers employed in each of the switches.

Figure 8 is a view substantially similar to Figure 3, but in which the switch rail is omitted, showing the switch moved to angle position to arrange the truck on to the lower side rail of the track, the position of the truck on the switch being indicated by the dotted lines and the position of the truck on the lower track rail being shown in full lines.

Figure 9 is a greatly enlarged sectional view approximately on the line 9—9 of Figure 2.

Figure 10 is a plan view of the truck.

Figure 11 is an end view thereof.

Figure 12 is a side elevation thereof.

Figure 13 is a side elevation of the car or coach.

Figure 14 is a fragmentary inverted plan view thereof.

Figure 1:
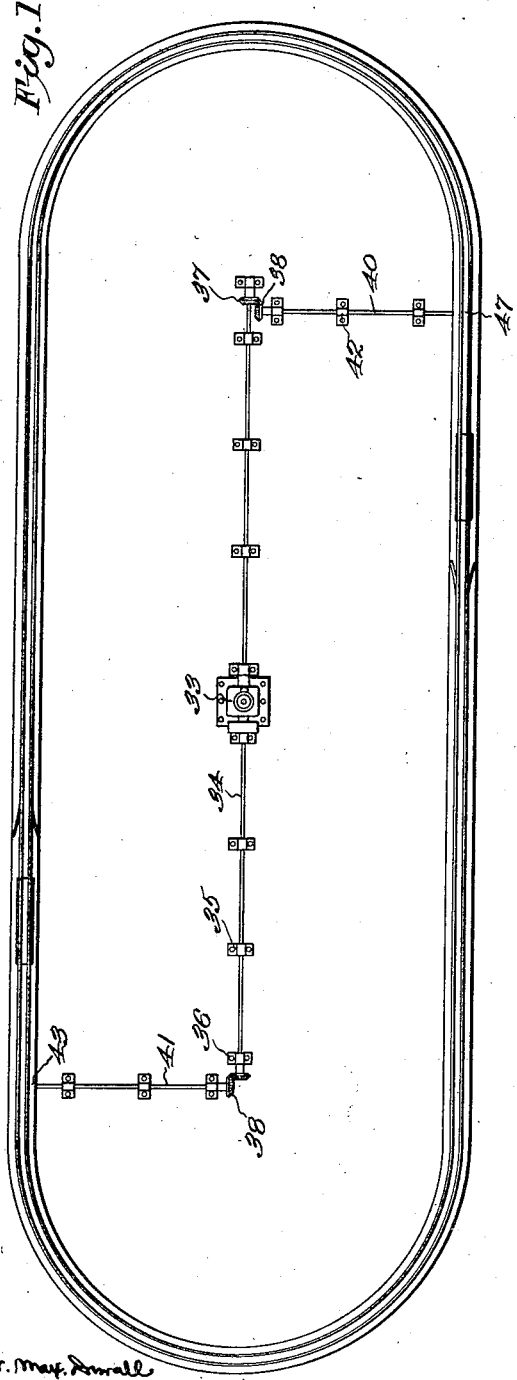
Figure 1 is a plan view of my improved amusement device.

The frame work of my amusement device may be wholly constructed of metal, angle irons preferred. The frame work is also suitably braced to insure a strong and effective structure. On a suitable base which may be of concrete when the device is permanently arranged in a park or the like, there are secured vertical standards 1. These standards necessarily vary in length for a reason which will be apparent as the description progresses. These standard support adjacent to the upper ends thereof a track, the said track comprising spaced parallel rails. As the track is split or divided at the sides of the construction, I, in reality, employ two tracks. The track is substantially elliptical in plan, the rails constituting the same have their ends arranged at a spiral inclination with respect to the sides of the rails. Also, as clearly disclosed in Figures 3 and 8 of the drawings, the sides of the track, at approximately the center thereof have the ends of their rails disposed one above the other in reverse relation with respect to the said opposite sides of the track or tracks.

For distinction, the side rails 1 of the first track are indicated, in the drawings, by the numeral 2, the side rails of the second track by the numeral 3, the upwardly rounded substantially spiral end of the rails 2 are indicated by the numeral 4, and those of the track 3 by the numeral 5. It will be seen, by reference to the drawings that the spiral ends 4 and 5 are oppositely directed, and also by reference to Figures 3 and 8 that the rails at the sides of the tracks are disposed at a similar inclination from the ends thereof. The rails 2, at the ends of the respective tracks are disposed a considerable distance above the rails of the track 3, the rails of the track 3 are inclined upwardly, as at 6 toward the rails of the track 2. In Figure 3 of the drawings, the upwardly inclined edge 6 of the rails of the track 3 are in contacting engagement with the under face of the rails of a switch 7, the said switch rails being disposed in substantially the same inclination as the track rails, and the ends of the switch rails extending beyond the ends 6 of the track rails 3 are inclined upwardly, as at 8 and connected to the under faces of the rails of the track 2. Also in the said Figure 3 it will be seen that a guard rail 9 is disposed above the rails of the track 2, the said guard rail extending beyond the end of the said track 2 and having its said extended portions rounded upwardly, as at 10. The referred to parts of the main and switch rails are inclosed in suitable housings 11, and in the construction disclosed in the said Figure 3 of the drawings, there are supported on pivots 12 secured in the sides of the housing 11 switches which are broadly indicated by the numeral 13. As disclosed in the detail figures of the drawings, the switches 13 each comprise a pair of rails 14 which are normally in parallelism with the rails of the track 2 and with the rails of the switch 7 respectively. The rails 14 are provided with inwardly directed bosses 15 through which the pivot members 12 pass, and to the rear of the bosses the rails are enlarged, being provided with upwardly rounded portions 16 preferably covered by a facing 17. The sides 16 of the headed ends of the switches are connected together by castings or similar means 18, and arranged between the connecting elements 18 there are tubular members or sleeves 19 through which are passed the cross sectionally rounded parallel arms 20 on the head 21 of a buffer member 22. On the free ends of the arms 20 there are preferably adjustable elements 23, and on the said arms between the head 21 and the sleeves 19 there are springs 24. The lower corners of the rails 14 of the switch members are cut at an inclination, as indicated by the numeral 25, and the pointed ends of the said rails are slightly spaced away from the ends of the rails of the track 2, and the rails of the switch 7. The switches are normally supported on suitable sustaining means 26 which may be in the nature of plates secured between the side walls of the housing 11.

Figure 2:
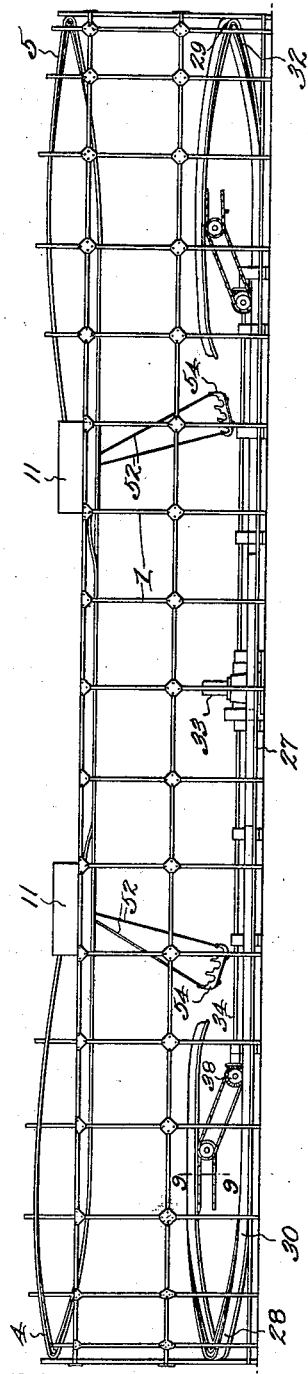
Figure 2 is a side elevation thereof.
Figure 15:
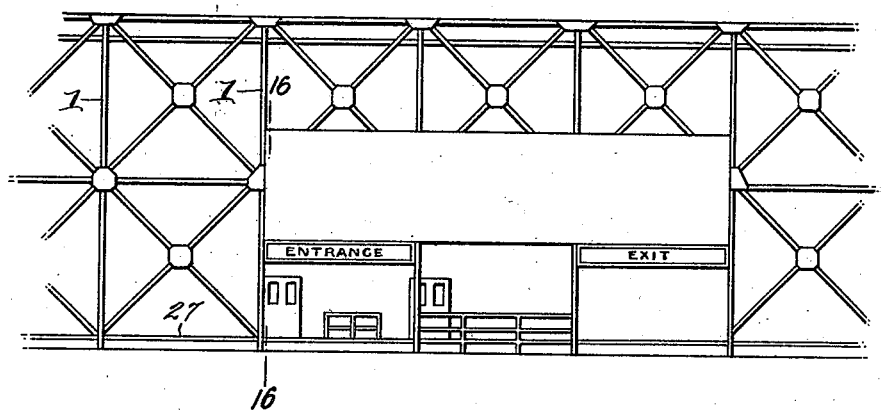
Figure 15 is a fragmentary elevation looking toward the entrance and exit of the device.
Figure 16:
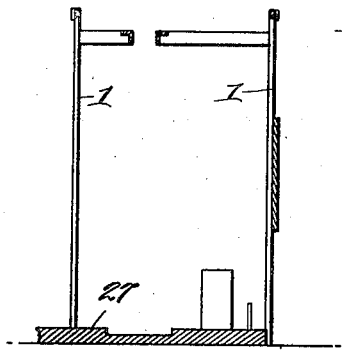
Figure 16 is a sectional view on the line 16—16 of Figure 15.

Secured to the uprights 1 at the sides of the construction are the straight portions 27 of a platform. The ends of the platform are round in plan and are arranged at an upward spiral curvature corresponding to that of the ends 4 and 5 of the respective tracks 2 and 3. These last mentioned portions of the platform are indicated for distinction by the numerals 28 and 29 respectively. On the upper faces of the said ends 28 and 29 of the platform there are the rails of tracks 30 and 31 respectively. The said rounded and upwardly inclined ends of the platform have central slots or openings therethrough through which there are trained endless chains 33 and 34 respectively, the said chains being guided over sprocket wheels 35 respectively. It will be noted, by reference to Figure 2 of the drawings that the ends of the elevated portions 28 and 29 of the platforms terminate a suitable distance away from the respective housings 11, and that the said ends of the platforms and the tracks thereon are downwardly directed.

In the center of the frame work above described there is positioned a suitable motor 33 having a longitudinal shaft 34 which extends therefrom in opposite directions, the said shaft being journaled in suitable bearings 35 and having on its ends gears 36 and 37 which are in mesh with pinions 38 and 39 secured on the ends of oppositely directed right angularly disposed shafts 40 and 41 respectively. The shafts 40 and 41 are journaled in suitable bearings 42 respectively and have on their ends sprocket wheels 43 and 44 respectively that are in mesh with respective endless chains 34 and 35 respectively.

Arranged for travel over the tracks 2 and 3 there is a wheeled truck which is broadly indicated by the numeral 45 in the drawings. The truck is preferably wholly constructed of metal, carrying at its ends axles on which are journaled flanged wheels 46. The body of the truck, in a line with its center has at its ends depending eye members 47, the eyes being formed on the ends of bolts 48 which are received in suitable bearings 49 in the body of the truck, the said bolts being engaged by nuts 50. Connected to each eye member 44, preferably through the medium of a ring 51, there is a flexible element 52, the said flexible elements having their ends received through and secured to eye members 53 on the upper ends of the body of the car 54. The car has journaled adjacent to its ends flanged wheels 55 respectively, the said wheels being designed for travel over the rails of the tracks on the elevated ends of the platform, the suspending means between the truck and car being such as to hold the car elevated above the straight portions of the platform. On the bottom of the car body, to the rear of the respective front and rear wheels 55 there are depending elements in the nature of fingers 56, and these fingers are designed to be contacted by fingers or spurs 57 which are projected from the links of the endless chains 33 and 34.

As is apparent from the drawings, the side portions of the rails comprising the tracks 2 and 3 are disposed at the same inclination, the inclination being sufficient to permit of the truck gravitating over the said side portions of the tracks. The track 2, at the portion thereof opposite the entrance and exit of the device has its rails practically horizontally straight, so that the truck and the car carried by the truck can be readily halted at these points. If desired, suitable mechanical means may be provided to contact the car and hold the same at these points, to permit of the passengers leaving and entering the car. The car is moved bodily toward the elevated portion 28 of the platform, the fingers or spurs on the endless chain 33 engaging the fingers or contact elements 56 on the car will automatically move the car bodily over the said elevated portion of the platform, and because of its connection with the truck, the truck will be caused to move over the elevated end of the track 2 by the car. It is to be understood that at least two trucks and cars are employed. After its travel over the rounded end 4 of the track 2 and after the chain 33 has its fingers brought out of engagement with the elements 56 on the car the truck will be arranged in a position to gravitate on the inclined side of the track 2, the chain in its final engagement with the car giving an impulse to the truck in such movement.

The truck will first enter one of the housings 11, traveling off of the rails of the main track on to the upper switch member 13, and contacting the buffers 21 of the said switch member will be projected rearwardly, or in the direction of the track which it has just left. Such movement will cause the swinging of the switch so that the car will be delivered on to the switch rails 7 immediately below the switch, and being arranged at an inclination the truck will receive the desired momentum to cause the same to travel in a reverse direction on the said switch rails, and thereafter travel in an opposite direction over the switch rails on to the second switch 13, forced into contact with the buffers on the said switch and receiving momentum therefrom in an opposite direction, causing the tilting of the switch and the delivering of the car on to the rails of the track 3, on which rails the said car will gravitate. During this movement of the truck, it will be apparent that the car will be imparted a swinging motion. When the truck and car approach the second elevated end of the platform, the depending fingers on the car will be engaged by the lugs or fingers on the endless chain 34, and the car and truck will be elevated and given an impeding motion in the direction of the second housing containing the switches. The motion imparted to the car and truck in the said second housing is, of course, similar to that previously described.

In Figure 8 of the drawings, the switch rails have been omitted, the truck being transferred directly from the rails of the track 2 on to the rails of the track 3.

It is thought that the foregoing description, when taken in connection with the drawings will fully set forth the construction and operation of the improvement to those skilled in the art to which this invention relates, so that further detailed description will not be attempted. It is thought necessary to state, however, that the nature of the invention is such as to render the same susceptible to changes from the construction illustrated and herein described, and therefore it is to be understood that I may resort to all such modifications as fall within the scope of what I claim.

Having described the invention, I claim:—

1. The combination, in an amusement device, of elevated tracks, a truck arranged for travel thereon, a car suspended from the truck, means influencing the car to cause the truck to travel over parts of the track to arrange the truck for gravitation over other parts of the track, means transferring the truck from one on to the other track and for imparting a reverse movement to the truck and a swinging motion to the car in such transfer.

2. The combination, in an amusement device, of elevated tracks which have their rails raised at parts throughout the length thereof, a truck arranged for travel on the tracks, a car suspended from the truck, means influencing the car to cause the same to move the truck over the raised portions of the tracks and to impart an impetus to the truck to cause the same to travel over the other portions of the tracks, and means transferring the truck from one on to the other track, and for imparting a reverse movement to the track and a swinging movement to the car in such transfer.

3. The combination, in an amusement device, of elevated tracks which have their rails raised at parts throughout the length thereof and which are inclined in the same direction from the said raised parts, a truck arranged for travel on the tracks, a car suspended from the truck, means engaging the car to move the same bodily to cause the truck to travel over the raised portions of the track and for imparting an impeding motion to the car and truck to cause the latter to travel over the inclined portions of the tracks, means transferring the truck from one on to the other track, and means imparting a reverse movement to the truck, and a swinging motion to the car at the interval of such transfer.

4. The combination, in an amusement device, of elevated tracks, each substantially U-shaped in plan and having their side portions directed toward each other and the ends thereof disposed in spaced lapping relation, a truck arranged for travel on the tracks, a car suspended from the track, means for bodily moving the car to impart a like motion to the truck to cause the same to travel over certain parts of the tracks and for impeding the truck in its movement over other parts of the tracks, means transferring the truck from one on to the other track, and means for reversing the travel of the truck and for imparting a swinging motion to the car at the interval of such transfer.

5. The combination, in an amusement device, of elevated tracks which are substantially U-shaped in plan and which have their side portions directed toward each other and the ends thereof disposed in spaced lapping relation, and a switch between the said ends of the tracks, a truck arranged for travel over the rails of the tracks, a car suspended from the truck, means bodily influencing the car to impart a like motion to the truck to cause the latter to travel over certain parts of the tracks and to give an impetus to the car for its travel over other parts of the tracks to direct the same from the rails of one track on to the switch, means on the switch influencing the truck in a reverse direction to transfer the same on to the rails of the second track and to impart a swinging motion to the car at the interval of such transfer.

6. The combination, in an amusement device, of elevated tracks, each of which being substantially U-shaped in plan, having their side portions directed toward each other and the ends thereof disposed in lapping spaced relation, the rounded portions of the tracks being arranged at opposite upward inclinations, a pivotally supported switch between the end rails of the tracks, a truck arranged for travel on the tracks, a car suspended from the truck, means bodily influencing the car to impart a like motion to the truck to cause the latter to ride over the upwardly inclined portions of the tracks and likewise impede the truck for travel over other portions of the tracks to direct the same on to the switch, means on the switch contacted by the truck for imparting a reverse movement to the truck to bring the same on to the switch outward of the pivot thereof to cause the swinging of the switch to direct the truck on to the rails of the second track and for also imparting a swinging motion to the car in such transfer.

7. The combination, in an amusement device, of elevated tracks which are substantially U-shaped in plan and which have their side portions directed toward each other and the ends thereof disposed in spaced lapping relation, said tracks having their rounded portions elliptical in side elevation and their side portions disposed at the same inclination, the lower rails of one track, at the ends thereof being rounded upwardly and connected to the rails of the second track, pivoted switches between the end rails of the respective tracks, spring influenced buffers on the switches, a truck traveling on the tracks, a car suspended therefrom, means engaging the car for bodily moving the same and for imparting a like motion to the truck to guide the truck over the elliptical ends of the tracks and to impart an impeding motion to the truck at its point of travel over the inclined portions of the tracks to direct the truck on to the switch and to cause the truck to contact with the buffer on the switch to be impeded thereby in a reverse direction to swing the switch to transfer the truck from the rails of one of the tracks on to the rails of the other track and to impart a swinging motion to the car at the interval of such transfer.

8. The combination, in an amusement device, of two tracks, the rails of which at the sides of the tracks being arranged in longitudinal alignment and at the same inclination and the end rails of the tracks being disposed in lapping but spaced relation, the lower rails at the ends of one of the tracks being rounded upwardly, and the rounded central portions of each of the tracks being raised, switch rails between the ends of the tracks, pivoted switches in line with the ends of the upper rails and in line with the switch rails, housings enclosing the ends of the rails, switches, and the switch rails, a spring influenced buffer on each of the switches, a truck arranged for travel on the tracks, a car suspended therefrom, means to engage the car to move the same bodily to impart a like motion to the truck to cause the latter to travel over the upwardly inclined central portions of the tracks and to be directed therefrom on to the inclined sides of the tracks to cause said truck to travel thereover on to one of the switches and to contact with the bumper thereon to be influenced in a reverse direction to tilt the switch to transfer the truck therefrom on to the switch rail and from thence be delivered on to the second switch and after contacting the bumper thereof to be transferred on to the rails of the second track and for likewise imparting a swinging motion to the car at the interval of such transfer.

9. The combination, in an amusement device, of elevated tracks comprising substantially continuous rails whose ends are disposed in spaced lapping relation and which tracks have upwardly directed portions throughout the length thereof, a body movable on the tracks, means for imparting motion to the body to direct the same over the upwardly inclined portions of the tracks to permit of the body gravitating over the other portions of the tracks, and means transferring the body from one track on to the other track and for imparting a reverse motion to the body at the interval of transfer.

In testimony whereof I affix my signature.

WILLIAM G. MILLER.